US012792639B2

(12) United States Patent
Mathis

(10) Patent No.: US 12,792,639 B2
(45) Date of Patent: Nov. 10, 2026

(54) PROMPT ENGINEERING ENGINE

(71) Applicant: SAP SE, Walldorf (DE)

(72) Inventor: Christian Mathis, Wachenheim (DE)

(73) Assignee: SAP SE, Walldorf (DE)

( * ) Notice: Subject to any disclaimer, the term of this patent is extended or adjusted under 35 U.S.C. 154(b) by 113 days.

(21) Appl. No.: 18/504,451

(22) Filed: Nov. 8, 2023

(65) Prior Publication Data

US 2025/0147990 A1 May 8, 2025

(51) Int. Cl.
*G06F 16/332* (2025.01)

(52) U.S. Cl.
CPC ................................ *G06F 16/3322* (2019.01)

(58) Field of Classification Search
CPC .................................................... G06F 16/3322
See application file for complete search history.

(56) References Cited

U.S. PATENT DOCUMENTS

2019/0108001 A1* 4/2019 Hauser ................ G06F 11/3672
2023/0176829 A1 6/2023 Rahmani et al.
2023/0245658 A1* 8/2023 Geng ..................... G06V 20/41

FOREIGN PATENT DOCUMENTS

WO 2023/022727 A1 2/2023

OTHER PUBLICATIONS

Rogers Jeffrey Leo John et al., SIGIYIOD—Companion '23, Jun. 18-23, 2023, Seattle, WA, USA (Year: 2023).*
Communication: "Extended European Search Report", European Patent Office, Aug. 26, 2024 (Aug. 26, 2024), for European Application No. 24166863.1-1203, 8pgs.
John, Rogers Jeffrey Leo et al., "DataChat: An Intuitive and Collaborative Data Analytics Platform", Proceedings of the 23rd International Middleware Conference Doctoral Symposium, ACMPUB27, New York, NY, USA, Jun. 4, 2023 (Jun. 4, 2023), XP059055423, DOI: 10.1145/3555041.3589678, ISBN: 978-1-4503-9942-5, (pp. 203-215, 13 total pages).
Communication pursuant to Article 94(3) EPC, European Patent Office, Nov. 11, 2025 (Nov. 11, 2025), for European Application No. 24166 863.1-1207, 5pgs.

* cited by examiner

*Primary Examiner* — Charles Rones
*Assistant Examiner* — Xiaoqin Hu
(74) *Attorney, Agent, or Firm* — Buckley, Maschoff & Talwalkar LLC

(57) ABSTRACT

A system and method including receiving a prompt specifying at least one task type; determining a system prompt based on the received prompt, the system prompt including artificial intelligence (AI) system configuration details corresponding to the at least one task type; pre-processing the system prompt to generate a pre-processed prompt including code referenced in the system prompt; transmitting, as an input prompt, the pre-processed prompt to an AI system; receiving, in response to the AI system executing the pre-processed prompt, a result from the AI system; and storing a record of the result from the AI system in a data repository.

14 Claims, 13 Drawing Sheets

900

Response:

The CDS view "/DMO/R_Travel_D" is defined as a root view entity for the draft reference scenario. It is based on the database table "/dmo/a_travel_d".

The view has the following elements:

1. Key fields:
  - "travel_uuid": Represents the unique identifier for each travel record.
...

2. Data fields:
  - "travel_id": Represents the travel ID.
  ...

FIG. 9

PROMPT ENGINEERING ENGINE

BACKGROUND

An application developer may typically design, create, deploy, and update programs for a particular application, operating system, or platform. In some instances, an application developer might want to evaluate existing applications in an effort to, for example, add new features thereto, complete updates, or reprogram the existing applications. A developer might also write new code to satisfy specifications for applications they are developing or previous applications. Different applications, operating systems, and platforms (i.e., computing environments) might require different code, specific to that computing environment.

Some generative artificial intelligence (AI) systems, such as a large language model (LLM), are configured to generate code in response to prompts provided thereto. LLMs typically accept prompts in natural language. Accordingly, it is vitally important that the language used in a prompt to a LLM is configured to enable the LLM to provide a response that includes correct and desired content.

In some cases, an application developer or other entity may want to investigate or understand aspects of existing applications and programming code or create new programming code related to a computing environment. For example, the developer might want to understand some programming code previously written by other(s) or generate new executable programming code to accomplish a desired objective. Solutions to these technical problems might be improved by leveraging a large language model (LLM). It would therefore be desirable to efficiently generate prompts related to a computing environment for a LLM that elicit a desired response from the LLM that is accurate for the related computing environment.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 9 is an illustrative depiction of an example LLM response to a prompt provided by a prompt engineering engine, in accordance with an example embodiment;

Figure 1:
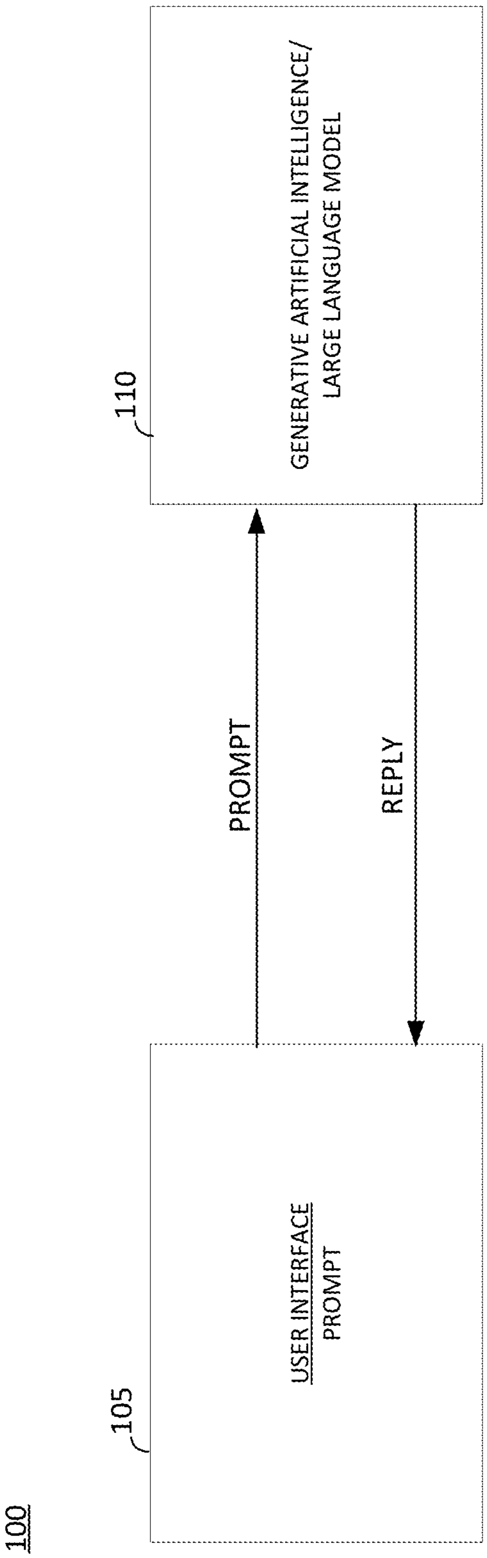
FIG. 1 is an illustrative depiction of a system, typical of some prior systems.

Throughout the drawings and the detailed description, unless otherwise described, the same drawing reference numerals will be understood to refer to the same elements, features, and structures. The relative size and depiction of these elements may be exaggerated or adjusted for clarity, illustration, and convenience.

DETAILED DESCRIPTION

In the following description, specific details are set forth in order to provide a thorough understanding of the various example embodiments. It should be appreciated that various modifications to the embodiments will be readily apparent to those skilled in the art, and the one or more principles defined herein may be applied to other embodiments and applications without departing from the spirit and scope of the present disclosure. Moreover, in the following description, numerous details are set forth for the purpose of explanation. However, one of ordinary skill in the art should understand that embodiments may be practiced without the use of these specific details. In other instances, well-known structures, methods, procedures, components, and circuits are not shown or described so as not to obscure the description with unnecessary detail. Thus, the present disclosure is not intended to be limited to the embodiments shown but is to be accorded the widest scope consistent with the principles and features disclosed herein.

FIG. 1 is an illustrative depiction of a system, typical of some prior systems. System 100 includes a user interface (UI) 105. User interface 105 may be implemented by one or more of a user device (e.g., a personal computer, smartphone, etc.) or application (e.g., a web browser) that is configured to receive a prompt from a user or other entity (e.g., an application, program, etc.) and send the prompt as an input to a generative AI (artificial intelligence) or LLM (large language model) system 110. In general, a generative AI or LLM system learns the patterns and structure of the training data used to train it and generates new data having similar characteristics. In some instances, generative AI or LLM system 110 may be capable of generating text, images, audio, and other media types using generative models, depending on the training data used to train the particular system. In some embodiments, generative AI or LLM system 110 may be trained on programming language code, thereby enabling the AI system to generate new computer code having similar characteristics to the code on which it was trained. As illustrated in FIG. 1, a prompt is received from UI 105 by generative AI or LLM system 110 and the generative AI or LLM system processes the received prompt and generates a reply that is returned to UI 105.

In some contexts, an application or platform developer might want to leverage some processing aspects of a generative AI or LLM system. For example, a developer might want to use some aspects of a generative AI or LLM system to generate code for certain tasks the developer is working on. In some instances, the developer might want to evaluate existing code (e.g., legacy code written by others) to, for example, understand the existing code, add new features to the existing code, verify the code complies with current coding specifications/guidelines or practices, complete updates, etc. The developer might also want to generate new code in accordance with certain specifications for applications they are tasked with developing code.

As an example with reference to FIG. 1, a developer working in a particular computing environment might provide a prompt of "create a database table named z_my_accounts with attributes id, description, account_number" to AI system 110 via UI 105, expecting the AI system to return code including the attributes specified in the prompt and represented in the programming language used in the computing environment the developer is working. In this example, the AI system might be GPT-3.5 or GPT-4 (Generative Pre-Trained Transformer, developed by OpenAI). In response to executing the prompt, AI system 110 returns code to generate a database table with the attributes specified in the prompt. However, the returned code is not in the programming language used in the computing environment in which the developer is working. For example, the returned code may be in SQL (Structured Query Language), whereas the programming language used in the developer's computing environment is ABAP (Advanced Business Application Programming, developed by SAP SE). The returned code does not include the correct content in the format the developer desires. In some aspects, the AI system 110 did not understand what the developer wanted via the prompt or the AI system lacked certain context information.

Figure 2:
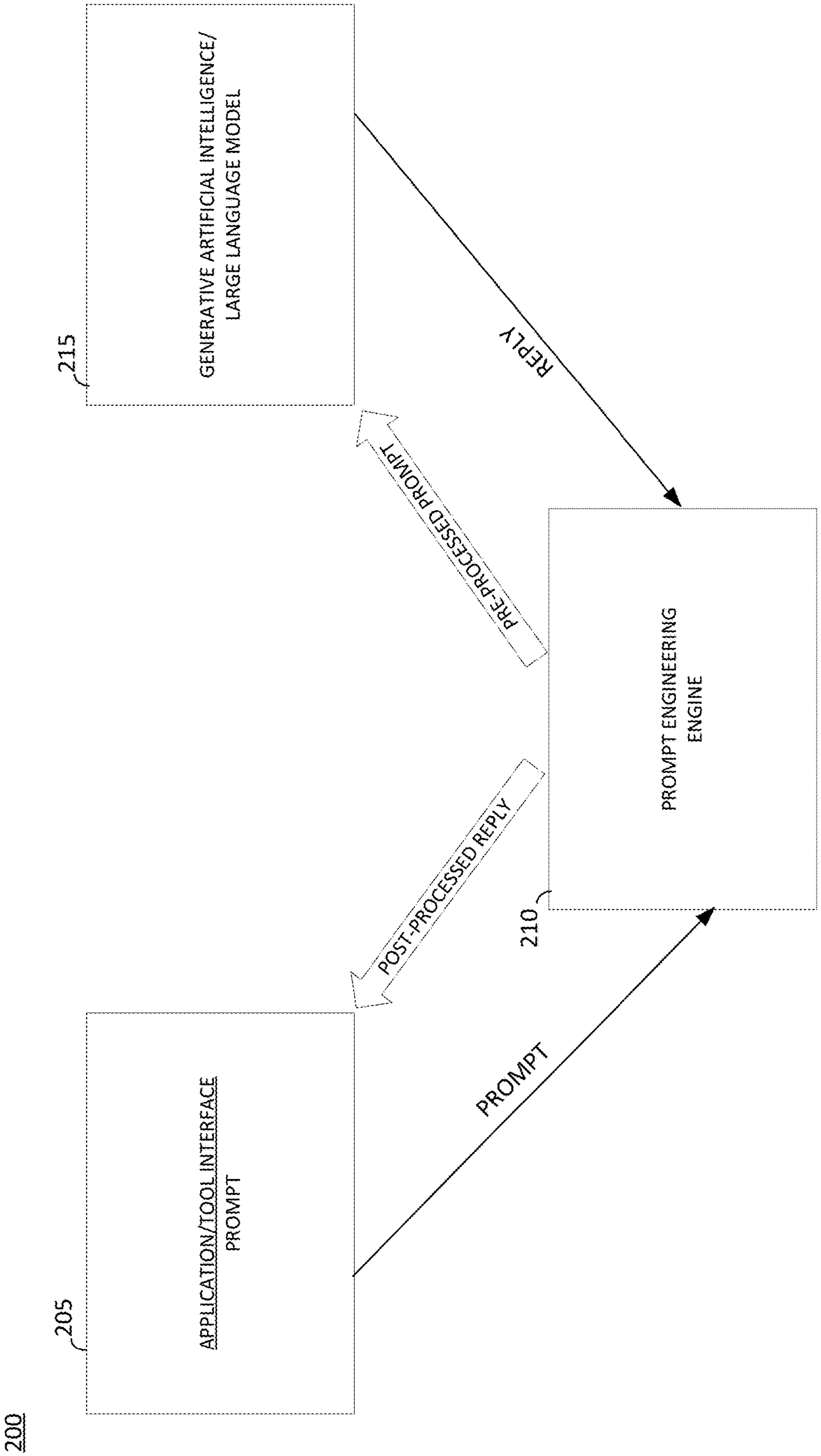
FIG. 2 is an illustrative depiction of a system including a prompt engineering engine, in accordance with an example embodiment.

FIG. 2 is an illustrative depiction of a system including a prompt engineering engine, in accordance with an example embodiment. System 200 includes an application or developer tool (e.g., an integrated development environment) that includes a user interface (UI) 205. UI 205 may be configured to receive a prompt from a user. In some instances, the application or developer tool might be configured to automatically generate, at least partially, the prompt based on the user's interactions with the application or developer tool. The prompt is sent to prompt engineering engine 210 via UI 205 as an input to the prompt engineering engine. As will be described in greater detail below, prompt engineering engine 210 processes the prompt to determine a pre-processed prompt (e.g., the pre-processed prompt is determined based on the initial prompt) that is sent to generative AI or LLM system 215. As used herein, generative AI or LLM system 215 may be interchangeably referred to as a LLM. Generative AI or LLM system 215 may be capable of generating text, images, audio, other media types, and programming language code using generative models, based on the training data used to train the LLM system. In general, the pre-processed prompt includes configuration details and context information to enable LLM system 215 to efficiently return a reply that accurately includes the details requested in the prompt. The reply, based on the pre-processed prompt, may be further processed by the prompt engineering engine to generate a post-processed reply that is sent to the application or developer tool. The post-processed reply accurately includes the content details in the format or configuration requested in the initial prompt.

As an example with reference to FIG. 2, a developer working in a particular computing environment, ABAP (or other programming language), might provide a prompt of "create a database table named z_my_accounts with attributes id, description, account_number" to prompt engineering engine 210 via UI 205. In this example, the developer expects a response including ABAP code with the attributes specified in the prompt and accurately represented (e.g., syntax, formatting, etc.) in the programming language used in the computing environment the developer is working. The prompt engine may pre-process the prompt to generate a pre-processed prompt, where the pre-processed prompt includes details (e.g., instructions, rules, parameter values, context information, etc.) for LLM 215 to provide a reply including code to satisfy the task(s) requested in the initial prompt. The reply from LLM 215 may be processed by a post-processor of prompt engineering engine 210 to generate the post-processed reply that includes that desired response (i.e., correct content configured as requested) to fully comply with the request(s) and task(s) of the initial prompt.

As another example, a developer (or other entity) might want to understand some existing code that they have not written. While capabilities such as debugging or reading the code might be a way for the developer to gain an understanding of the code, the present disclosure provides mechanisms to use large language models (i.e., generally, AI) to automatically explain the subject code. In this example, the developer would like a certain ABAP CDS view (e.g., "/DMO/R_TRAVEL_D") explained, where CDS views are a part of ABAP created using Data Definition Language (DDL) to build or define data models. In this example, the CDS view "/DMO/R_TRAVEL_D" is an ABAP code artifact that is known to an ABAP system that the developer would like to have explained (i.e., What does this view do?).

In one example the prompt ("explain CDS view/DMO/R_TRAVEL_D") is submitted to a LLM (e.g., GPT-4) as illustrated in FIG. 1. This LLM does not have a connection to the developer's ABAP system and has no knowledge of the view "/DMO/R_TRAVEL_D". In response to the prompt, the LLM might reply with a response merely stating the view "/DMO/R_TRAVEL_D" is travel-related, indicating the exact code for the subject ABAP CDS view is not known because it is system defined in CDS and SAP systems. In this instance, the LLM may have some limited notion of what the view "/DMO/R_TRAVEL_D" is, but it cannot provide exact details of the CDS view to "explain" the view as requested in the prompt. In some instances where the LLM does not know the code, the LLM might present incorrect information (i.e., an AI hallucination) in reply to the prompt.

In another example, the prompt ("explain CDS view/DMO/R_TRAVEL_D") may be submitted to a prompt engineering engine as disclosed in FIG. 2 (e.g., prompt engineering engine 210) that adds certain information to the initial prompt to generate a pre-processed prompt that is presented and processed by a LLM. In return, the LLM provides a reply that might include a detailed line-by-line description or explanation of what the view (i.e., code artifact) "/DMO/R_TRAVEL_D" actually does. In some instances, the reply from the LLM may be further post-processed to configure the reply as specified in the initial prompt.

In some aspects, the present disclosure provides mechanisms applicable to various use cases, including functionality to achieve different desired tasks or results such as, but not limited to, for example, explaining code, tables, and other programming language artifacts and features; generating code, tables, and other programming language artifacts and features; etc.

In some aspects, the disclosed prompt engineering engine may execute certain functionality, including, but not limited to, explaining code, generating tables, explaining views, explaining behaviors, etc. In some embodiments, instructions may be determined for a LLM in the form of prompts or system prompts (e.g., configuration details and information for use by the LLM) in order to elicit good quality results from the LLM in reply to user prompts.

Figure 3:
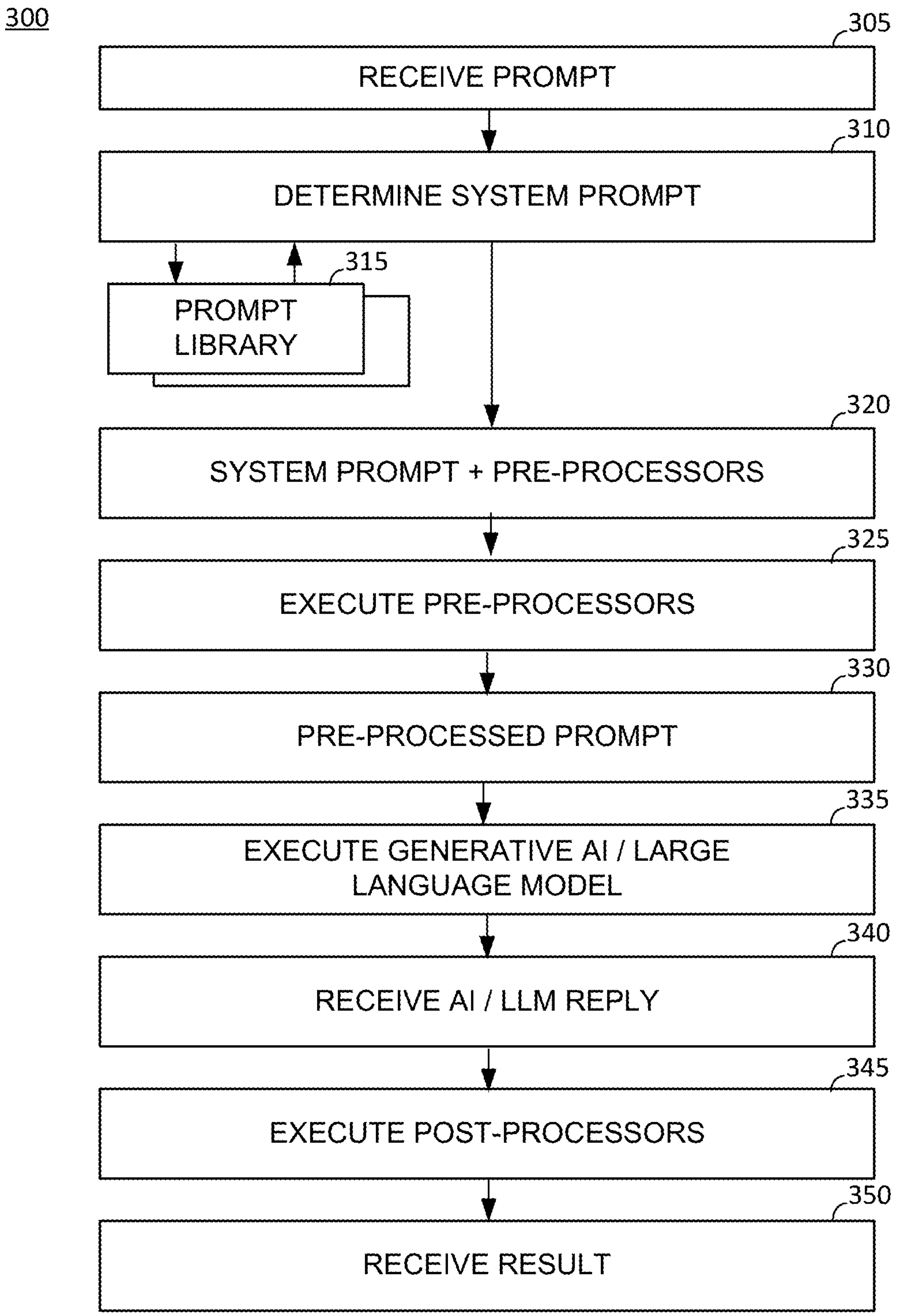
FIG. 3 is an illustrative flow diagram of a process, in accordance with an example embodiment.

FIG. 3 is an illustrative flow diagram of a process 300, in accordance with an example embodiment. In some embodiments, a prompt engineering engine herein may be applied, integrated, or otherwise used in an ABAP computing environment and referred to in such embodiments as an ABAP prompt engineering engine. In some embodiments however, a prompt engineering engine herein may be applied, integrated, or otherwise used in another computing environment other than ABAP. Process 300, in some aspects, provides an overview of a process that executes and applies a prompt engineering engine as disclosed herein.

At operation 305, a user (or other entity such as, for example, a system, an application or developer tool) specifies a prompt. Continuing the example introduced above, the prompt received at operation 305 is "explain view/DMO/R_TRAVEL_D". In this example, the user (or other entity) would like to have the code artifact (i.e., the view named "/DMO/R_TRAVEL_D") in the user's system explained. In some aspects, the prompt may specify at least one task type or type of task to be accomplished. In the present example, the prompt "explain view/DMO/R_TRAVEL_D" specifies the task type of explaining a view. Other task types might include, for example, creating a table, view, or other code entity or feature.

At operation 310, the initial prompt may be augmented with additional information to determine a "system prompt". The system prompt is determined based on the initial prompt and should include information so that a LLM or other generative AI (e.g., GPT-4) has an improved chance to actually return an accurate and complete (i.e., good) result with respect to the initial prompt when the system prompt is provided as an input to the LLM.

As part of determining a "system prompt" as indicated at operation 310, prompt library 315 may be referenced, invoked, or otherwise used to determine the system prompt. In some embodiments, for every task type that a prompt engineering engine herein supports (e.g., explain code, views, tasks, etc.; create table, rules, etc.; create CDS view, rules, etc.; generate data generator, rules, etc.; etc.), there is a corresponding "system prompt" (e.g., system setup or configuration details). In some aspects, a system prompt may refer to configuration details for an LLM that may be used to initialize a communication with the LLM, which may include certain rules and instructions for the LLM to use when executing a prompt so that the LLM can better understand or know what type of response is requested from it. As such, there may be different "system prompts" for different task types (i.e., as specified in the user-supplied "prompt" at operation 305).

As an example, there may be a system prompt for each of the task types "explain code", "create table", "create CDS view", "create application", "generate data", etc. In some aspects, system prompts are extensible such that for each use-case (i.e., task type), a corresponding "system prompt" may be determined or generated. In some embodiments, system prompts stored in prompt library 315 or generated based on features therein might be edited (e.g., modified, added to, deleted, etc.) and used to determine a system prompt associated with a current or future prompt.

In some embodiments, a LLM used at operation 310 to determine a system prompt might be selected or otherwise determined based on an ability or proficiency of the LLM to, for example, understand the intent of the initial user (or other entity) prompt received at operation 305 and use that initial prompt to determine a system prompt that can cause accurate result(s) when the system prompt is further provided as an input to a LLM (e.g., FIG. 3, operation 335). In some embodiments, the suitability of a LLM for determining a system prompt herein may be based, at least in part, on the model and the training data used to train the LLM. In some aspects, the LLM used at operation 310 to determine a system prompt might be able to understand or distinguish from the initial prompt what the initial prompt is about or wants to do (i.e., task type) and further determine the appropriate system prompt in cooperation with the prompt library (e.g., FIG. 3, 315). In some embodiments, a LLM may be specifically configured, trained, or otherwise adapted to execute the determining of a system prompt herein.

In some aspects, after the system prompt is determined at operation 310, the remainder of process 300 may be completely agnostic of the LLM or AI used in executing the disclosed operations (e.g., operations 325, 335, and 345). For example, in some embodiments the LLM used to determine the system prompt at operation 310 may be different than the LLM that is executed at operation 335 to generate a desired response at 340. In some embodiments, the LLM or AI used in executing the operations after the determination of the system prompt may be selected or otherwise determined based on, for example, the particular use case or implementation of an application. As an example, a particular use case may relate to language processing, for which a certain LLM might be particularly suited. While that certain LLM might be particularly suited to the language related use case and selected for use in the present example at operation 335, the framework depicted by process 300 (or elsewhere herein) is not limited to any particular LLMs.

In some embodiments, prompt library 315 may support pre-processors and post-processors, where pre-processors act to process a prompt before it is presented to a LLM and post-processors act to process a reply from the LLM. In some embodiments, the pre- and post-processors are provided as part of the prompt engineering engine (e.g., in ABAP as part of the prompt library). In some aspects, the pre- and post-processors may be defined by the users of the prompt engineering engine.

In some embodiments, users (e.g., developers or other authorized entities) may define the configuration details and rules specified by the system prompts and define the pre- and post-processors.

Figure 4:
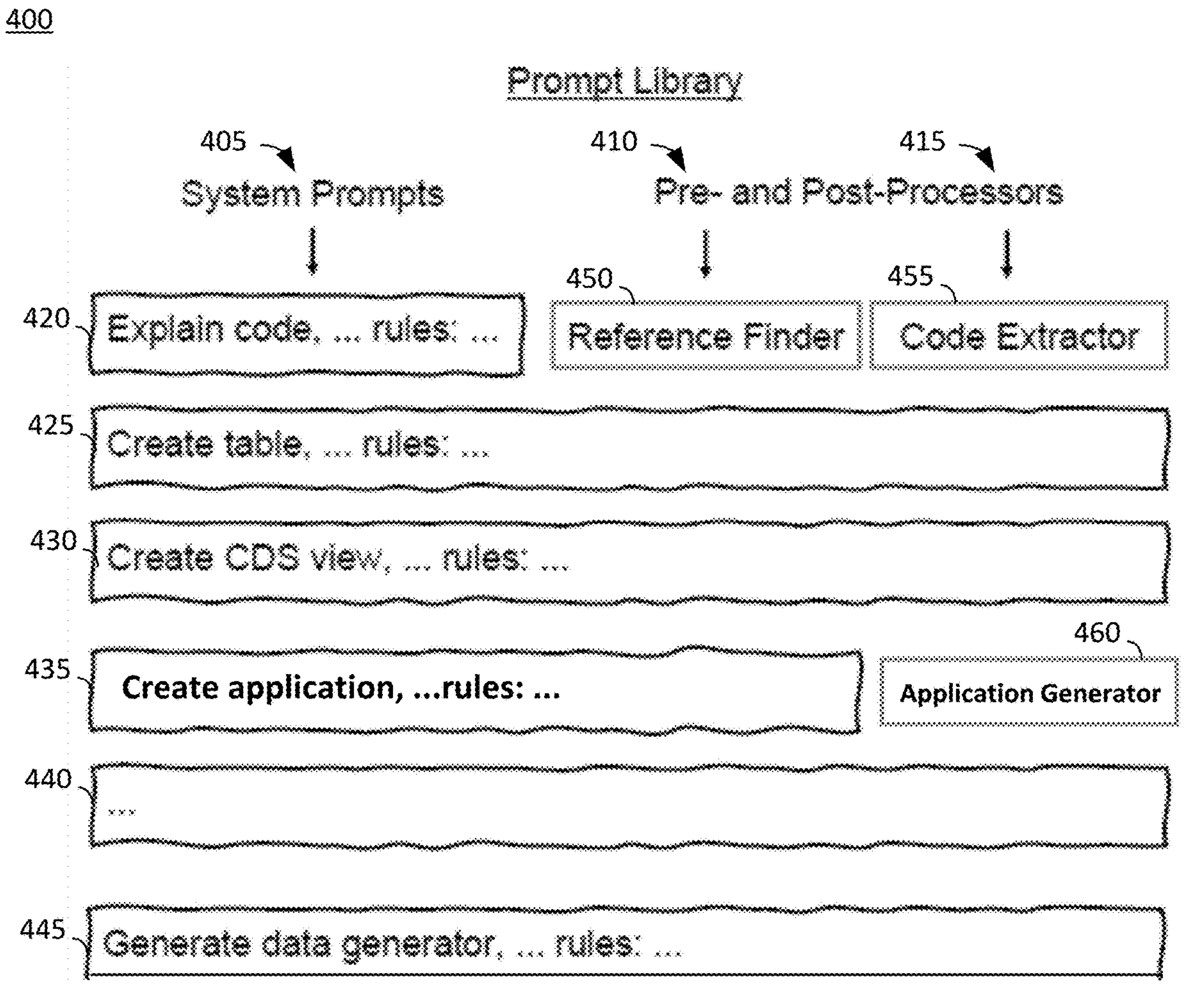
FIG. 4 is an illustrative depiction of a prompt library for a prompt engineering engine, in accordance with an example embodiment.

FIG. 4 is an illustrative depiction of a prompt library 400 for a prompt engineering engine, in accordance with an example embodiment. As shown, prompt library 400 includes system prompts 405, pre-processors 410, and post-processors 415. In the example of FIG. 4, the listed system prompts include a system prompt 420 for a task type to explain code, rules, etc.; a system prompt 425 for a task type to create table, rules, etc.; a system prompt 430 for a task type to create CDS view, rules, etc.; a system prompt 435 for a task type to create a RAP (RESTful Application Programming Model) application, rules, etc.; a system prompt 440 for other task types; and a system prompt 445 for a task type to generate data, etc. Some embodiments may include additional, fewer, or other system prompts than the system prompts expressly shown in FIG. 4.

In prompt library 400, the listed pre-processors include a reference finder 450 and a code extractor 455. The illustrated post-processor(s) includes RAP generator 460. The pre-processors and post-processors depicted in FIG. 4 are examples of some embodiments, not a limitation to the extent of pre-processors and post-processors applicable to the prompt engineering engine disclosed herein.

Referring again to the example prompt of "explain view/DMO/R_TRAVEL_D", operation 310 to determine the relevant system prompt may be accomplished by asking the AI to choose from a given set of prompts (e.g., a list of prompts in a "prompt library" 315) one prompt that best matches what the prompt requests (i.e., the task to be accomplished). In this example, operation 310 may include, for example, filling in a system prompt template from a list of system prompt templates from prompt library with information specified in the initial prompt. At operation 310, the AI may determine the user wants to "explain code" based on the initial prompt and select from the prompt library 315 a specific "rule" that correlates to the particular task of explaining code, as well as select the pre- and post-processors that correspond to the determined task type. The system prompt and pre-processors, as determined at operation 310, are depicted at 320.

Figure 5:
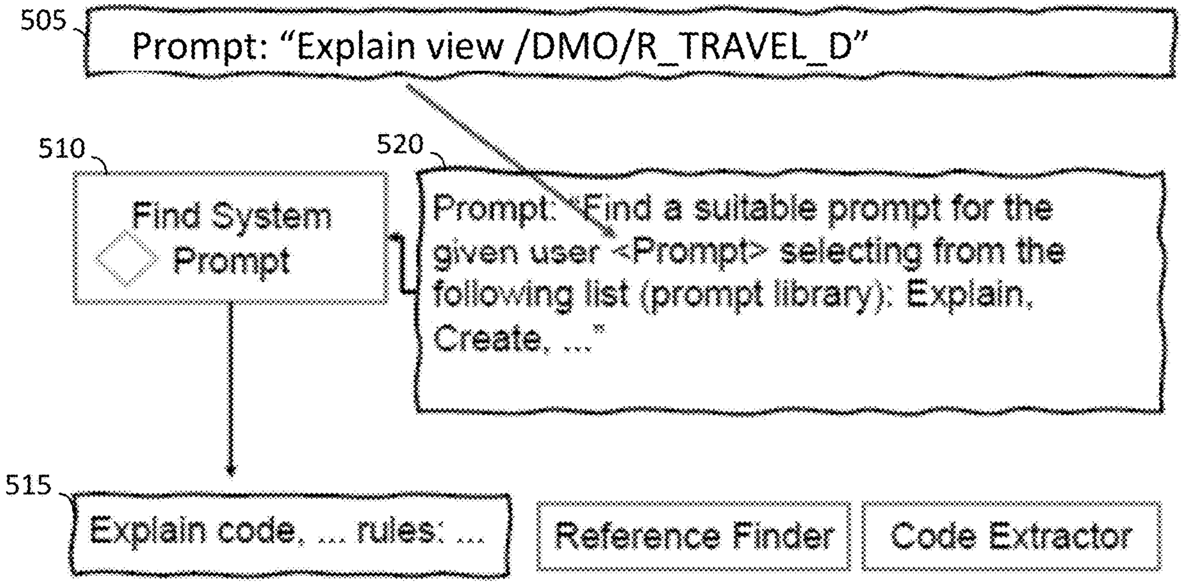
FIG. 5 is an illustrative depiction of some aspects for determining a system prompt by a prompt engineering engine, in accordance with an example embodiment.

FIG. 5 is an illustrative depiction of determining a system prompt by a prompt engineering engine, in accordance with an example embodiment. As depicted in FIG. 5, an operation 510 to determine a system prompt based on the prompt 505 (e.g., "explain view/DMO/R_TRAVEL_D") may cause the prompt engineering engine herein to select, possibly with the assistance of the LLM, system prompt 520 including prompt template 515 that may be populated with information from the prompt 505.

In the present example, process 300 has determined that the prompt engineering engine is being tasked to "explain" something. What exactly needs to be explained is to be further determined. At operation 325, the pre-processors associated with the system prompt at 320 are executed to find, for example, references to existing code artifacts in the ABAP system (i.e., the computing environment). In some embodiments, operation 325 to find references in the ABAP system may be supported by a reference finder that uses the LLM.

In some embodiments, the LLM (e.g., GPT-4 or other AI) may assist in determining the system prompt and features thereof, including the pre- and post-processors associated with a given system prompt.

Figure 6:
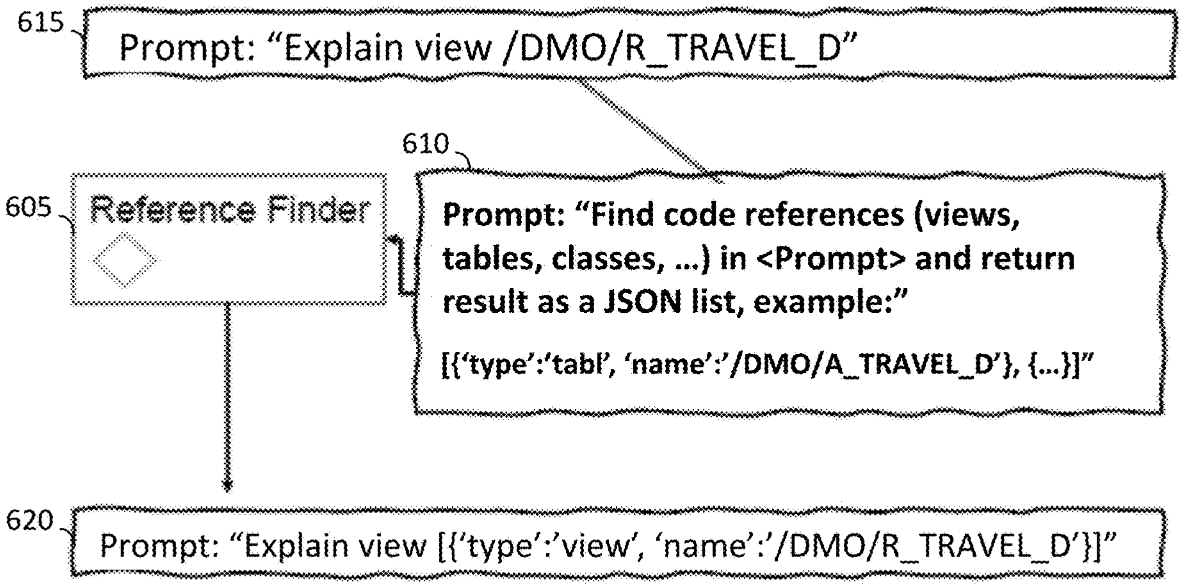
FIG. 6 is an illustrative depiction of some aspects related to a "reference finder" pre-processor of a prompt engineering engine, in accordance with an example embodiment.

FIG. 6 is an illustrative depiction of some aspects related to a "reference finder" pre-processor of a prompt engineering engine, in accordance with an example embodiment. In FIG. 6, a "reference finder" 605 pre-processor of a prompt library is used to find or otherwise determine code references in the prompt (e.g., "explain view/DMO/R_TRAVEL_D") 615 and return the results in a structured format (e.g., JSON notation) as illustrated at 610. Reference finder 605 may return, as illustrated at 620, an augmented prompt to "explain" a type of "view" named "/DMO/R_TRAVEL_D" (i.e., the referenced code, "/DMO/R_TRAVEL_D") that was specified in the original user-supplied prompt in the format (i.e., list) as specified.

Continuing with this example, a pre-processor referred to as a "code extractor" may be used to fetch the code for the view ("/DMO/R_TRAVEL_D) from the ABAP system (or other relevant computing environment). Operations to determine the system prompt in the current example have determined, by the reference finder as discussed above, that the term "/DMO/R_TRAVEL_D" in the initial prompt is a code artifact that should be in the prompt engineering engine's computing environment (i.e., in the ABAP computing environment in the present example)

Figure 7:
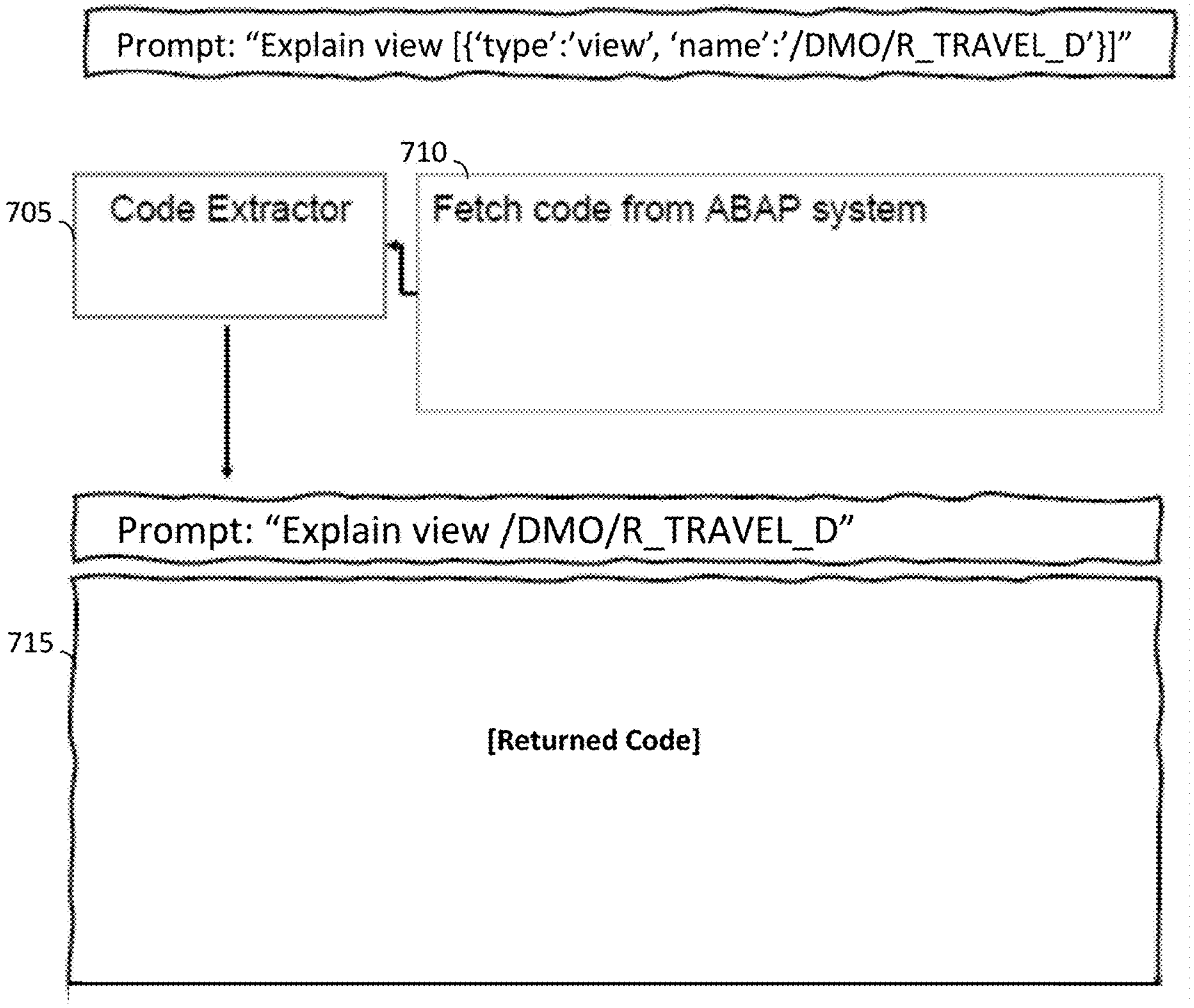
FIG. 7 is an illustrative depiction of some aspects related to a "code extractor" pre-processor of a prompt engineering engine, in accordance with an example embodiment.

FIG. 7 is an illustrative depiction of some aspects related to a "code extractor" pre-processor of a prompt engineering engine, in accordance with an example embodiment. In FIG. 7, a "code extractor" 705 of a prompt library is used to fetch or otherwise retrieve the code for the view "/DMO/R_TRAVEL_D" from the ABAP system, as depicted at 710. The code fetched from the ABAP system code by executing the code extractor may be presented at 715.

Referring to FIG. 3, the operations depicted in FIGS. 6 and 7 may correlate to operation 325, the execution of the pre-processors associated with the determined system prompt, to generate or otherwise determine a pre-processed prompt 330. In the present example, the pre-processors executed include a reference finder and a code extractor. Other pre-processors may be selected and executed depending on the determined system prompt(s) and initial prompt related to the determined system prompt(s).

Figure 8:
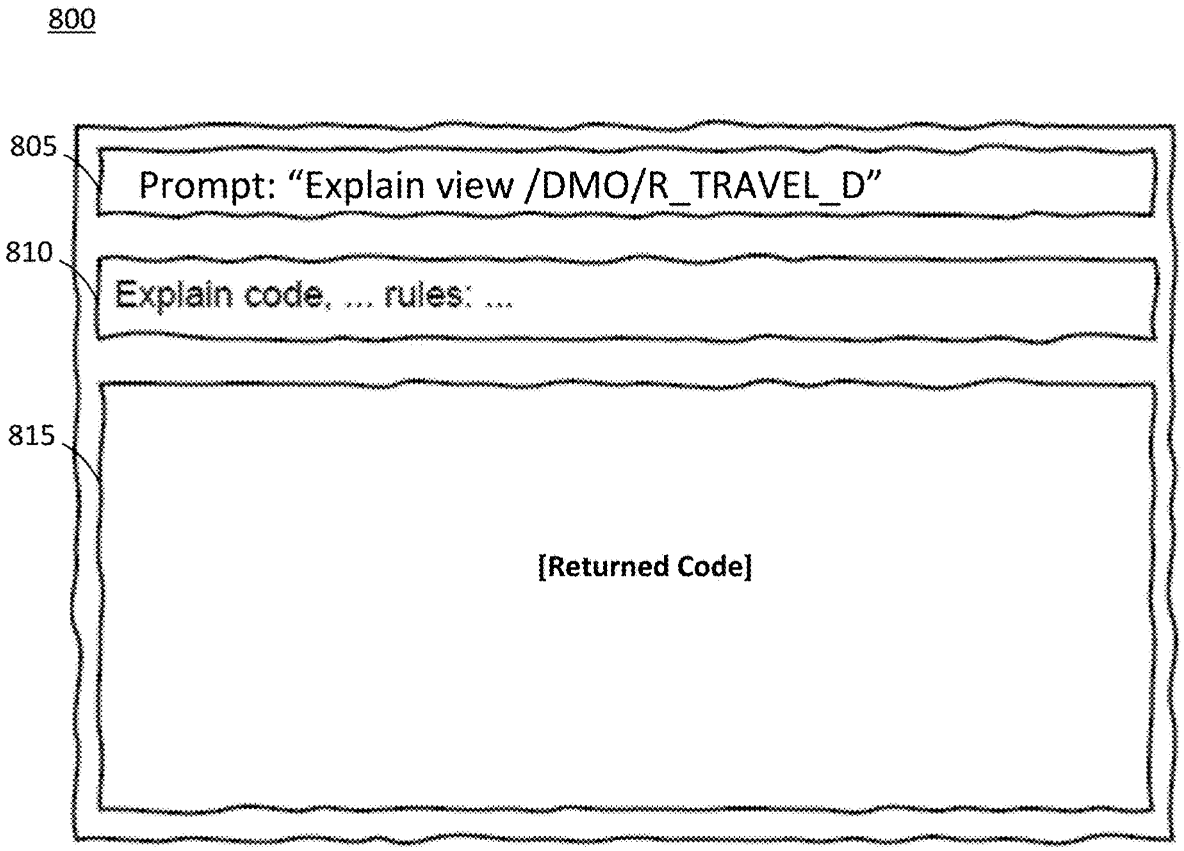
FIG. 8 is an illustrative depiction of an example pre-processed prompt, in accordance with an example embodiment.

FIG. 8 is an illustrative depiction of an example pre-processed prompt 800, in accordance with an example embodiment. The example pre-processed prompt 800 shown in FIG. 8 includes the initial prompt 805, the determined system prompt(s) 810 including configuration details for the LLM, and the relevant code 815 referenced and fetched by the pre-processors associated with the determined system prompt(s).

Having determined, generated, or otherwise assembled the pre-processed prompt 330, process 300 proceeds to execute the pre-processed prompt with the assistance of the LLM at operation 335. The pre-processed prompt may be submitted as an input to the LLM. In the present example, the user intention from the initial prompt (e.g., "Explain view/DMO/R_TRAVEL_D"), additional rules from the prompt library for the specified task (i.e., the system prompt(s)), and the code referenced in the prompt and retrieved from the ABAP system are included in the pre-processed prompt. The LLM is called at operation 335 to execute using the pre-processed prompt 330 to generate a relevant response or result 340. The result 340 may be stored in a data repository or other data storage device or system.

FIG. 9 is an illustrative depiction of an example LLM response 900 to a prompt provided by a prompt engineering engine, in accordance with an example embodiment. As illustrated in FIG. 9, the response from the LLM includes a full description or explanation of what the "/DMO/R_TRAVEL_D" view specified in the initial prompt is, including, for example, a line-by-line explanation of what the code associated with the specified view does or how it functions. Note that the example LLM response 900 illustratively depicts a portion of a possible response from the LLM.

Referring again to FIG. 3, at operation 345 one or more post-processors might be executed to further process the result returned by the LLM to generate a final result received at operation 350. Similar to the pre-processors, the post-processors executed at operation 345 may be specified or related to the particular task(s) specified in the initial prompt received from a user (or other entity).

Figure 10:
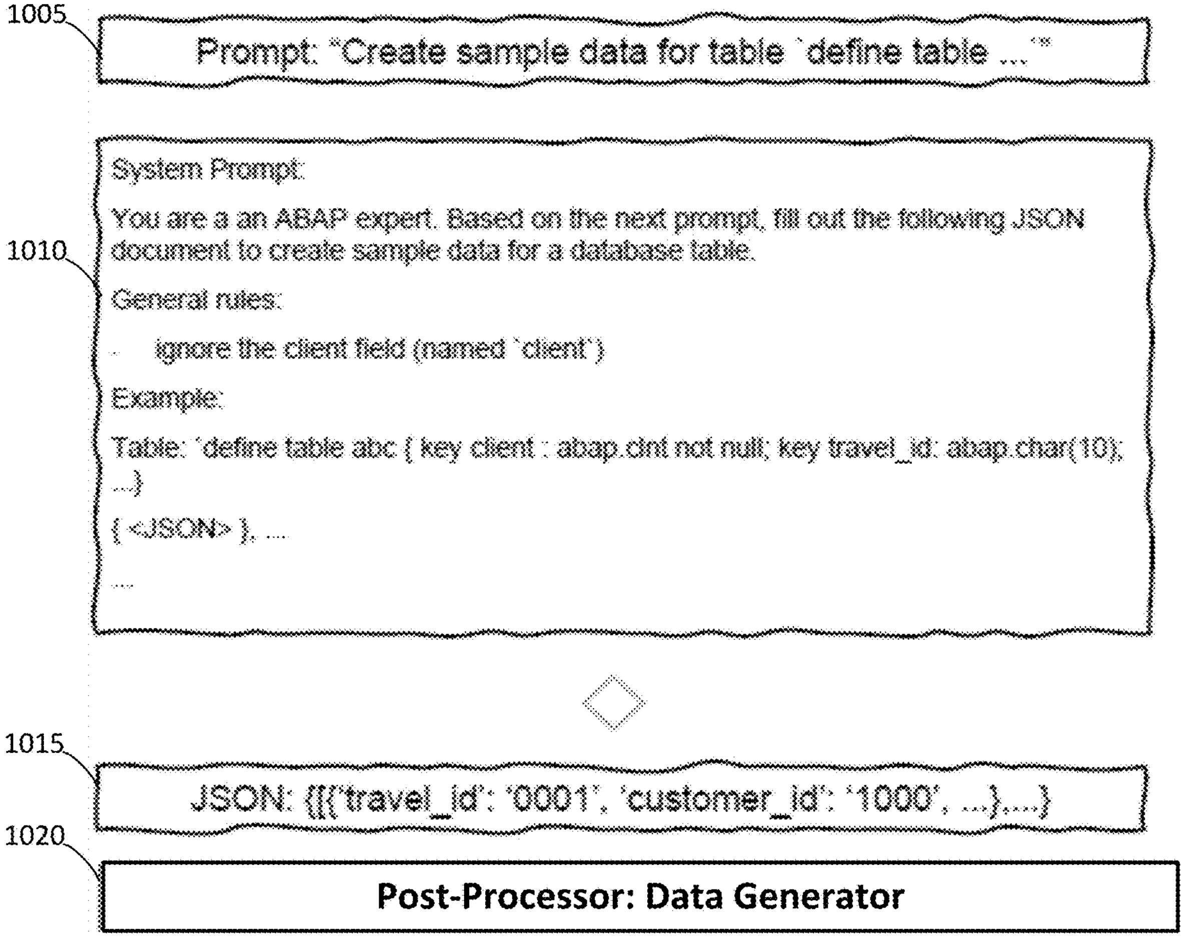
FIG. 10 is an illustrative depiction of some aspects related to a post-processor of a prompt engineering engine, in accordance with an example embodiment.

FIG. 10 is an illustrative depiction of some aspects related to a post-processor of a prompt engineering engine, in accordance with an example embodiment. In the example of FIG. 10, an initial prompt 1005 (e.g., "Create sample data for a database table . . . ") includes a request or task to write a natural language description to create sample data for a database table. Prompt 1005 might cause a prompt engineering engine herein to determine or otherwise generate a pre-processed prompt 1010, including a system prompt and additional information where the LLM is asked to return a JSON (JavaScript Object Notation) document that contains the generated sample data, as shown in FIG. 10. Executing the pre-processed prompt by the LLM may result in the JSON document 1015. Based on the task(s) specified in the initial prompt 1005 and the post-processor(s) associated with the determined system prompt, a post-processor (e.g., “Data Generator”) may be executed to transform the JSON document 1015 of the LLM result into a format or configuration as specified in the system prompt. In this example, a Data Generator type of post-processor may be called to process the JSON description of an application to create ABAP code containing a method to insert the generated data into the database table, as indicated at 1020.

In some embodiments, the LLM or AI used in executing the operations after the determination of the system prompt (e.g., operations 325, 335, and 345) may be selected or otherwise determined based on, for example, the particular use case or implementation of an application. In one or more instances, the LLM might be selected from the following listing of LLMs that include, GPT models (e.g., 3.5 Turbo and 4) provided by OpenAI; Luminous from Aleph Alpha; BLOOM (BigScience Large Open-science Multilingual Language Model) via Huggingface; Claude from Anthropic; Falcon from Technology Innovation Institute; Llama models from Meta AI; Command from Cohere; and PaLM developed by Google AI. The foregoing list is not intended to be exhaustive, rather it is illustrative of some of the types and variety of LLMs that may be used in accordance with the present disclosure.

Figure 11:
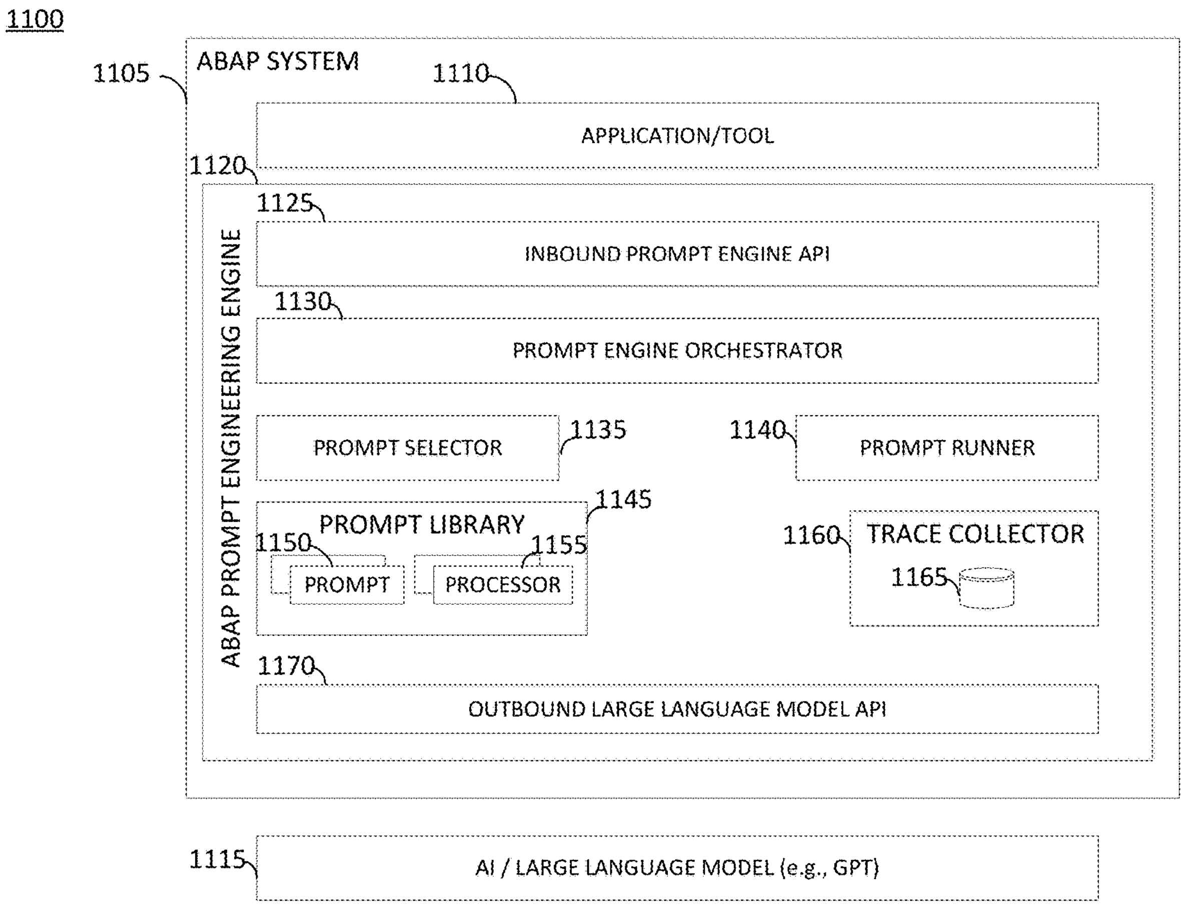
FIG. 11 is an illustrative block diagram of an architecture associated with a prompt engineering engine, in accordance with an example embodiment.

FIG. 11 is an illustrative block diagram of an architecture associated with a prompt engineering engine, in accordance with an example embodiment. In some embodiments, architecture 1100 is a high level architecture, where some components, including application or tool 1110, prompt(s) 1150, and processor(s) 1155 may be application specified parts that may be implemented in ABAP, that would use the ABAP system (e.g., ABAP system 1105). These components might be specified contents of ABAP system applications (e.g., SAP ERP, enterprise resource planning software/system, developed by SAP SE; SAP S/4 HANA, developed by SAP SE; etc.). In some embodiments, the ABAP (or other computing environment applications depending on context and use-case) applications might specify, generate, or determine system prompts 1150 and pre- and post-processors 1155, and include the application code to execute such functionality.

As an example, in an instance the application 1110 wants to invoke certain functionality including an interaction with LLM 1115, application 1110 may call an inbound prompt engine API 1125 of an ABAP prompt engineering engine 1120. The inbound prompt engine API 1125 may be configured to support communication between the computing environment application or tool 1110 and the ABAP prompt engineering engine 1120. In response to receiving the prompt, a call may be issued to a prompt engine orchestrator 1130 that coordinates call to a prompt selector 1135. The prompt selector 1135 may be configured to determine what task(s) are to be executed based on task type(s) derived from the prompt received from application or tool 1110. The prompt selector 1135 may determine the task(s) to be executed (i.e., determine a system prompt) via interactions with the prompt library 1145. The determined system prompt(s) may be provided to the prompt engine orchestrator 1130, wherein the prompt engine orchestrator may execute the supplied system prompt(s) (one or more system prompts, including in some instances a process defined as including multiple system prompts) via a prompt runner 1140. In some aspects, the prompt runner 1140 might operate to call the LLM 1115 via an outbound LLM API 1170. The outbound LLM API 1170 may be configured to facilitate communication between the ABAP prompt engineering engine 1120 and the LLM 1115. In some embodiments, the ABAP prompt engineering engine 1120 collects traces using a trace collector 1160 while the ABAP prompt engineering engine executes. In some aspects, the trace collector 1160 collects or saves (e.g., in data storage device 1165) a record or indication of what is sent to the LLM 1115 (e.g., pre-processed prompts, etc.) and what is received therefrom (e.g., results from the LLM in reply to processing the pre-processed prompts). The prompt engineering engine may further process a result received from the LLM 1115 using one or more post-processors 1155, wherein the prompt engine orchestrator 1130 may support the post-processing execution by the processors 1155.

Figure 12:
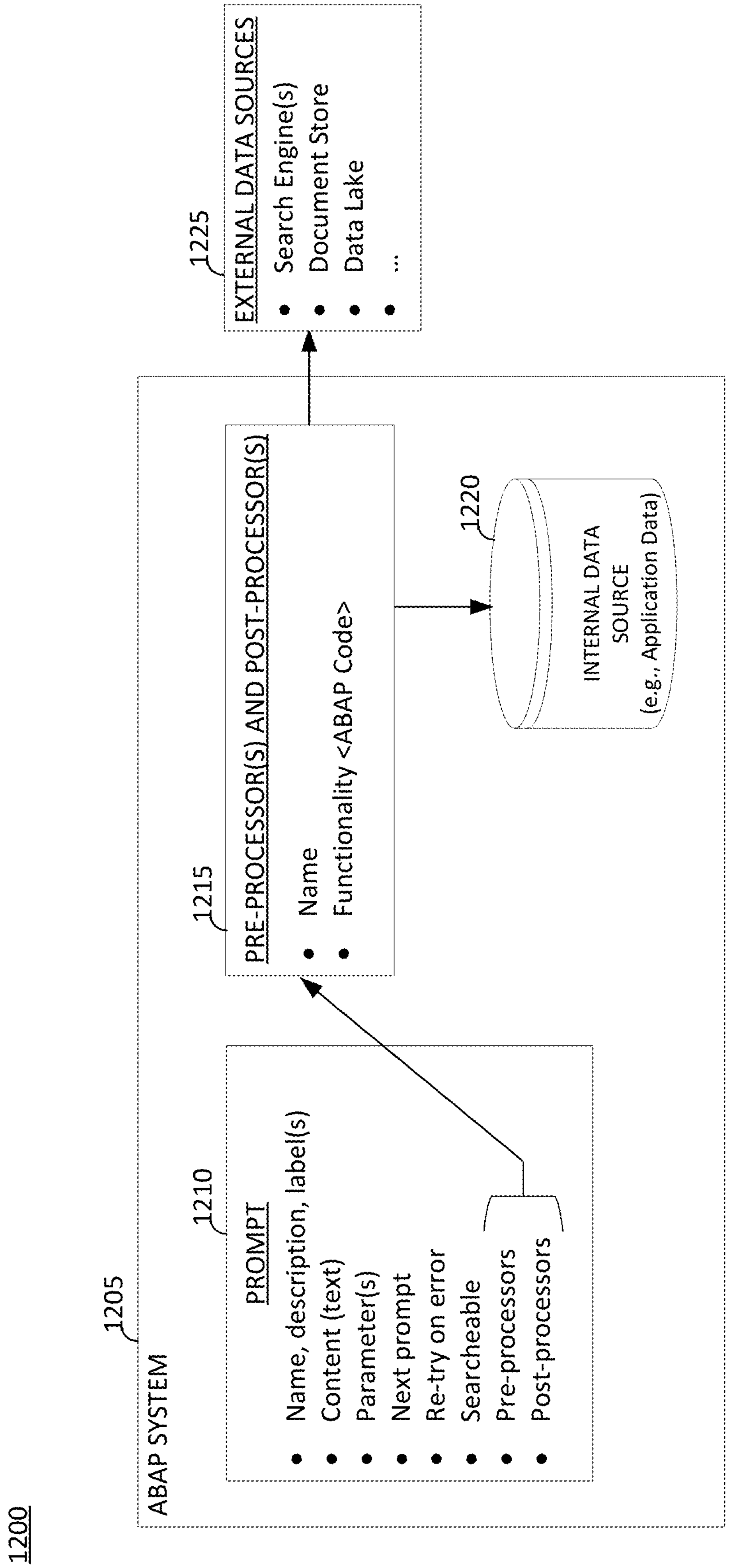
FIG. 12 is an illustrative block diagram including some detailed aspects of an architecture associated with a prompt engineering engine, in accordance with an example embodiment.

FIG. 12 is an illustrative block diagram including some detailed aspects of an architecture 1200 associated with a prompt engineering engine, in accordance with an example embodiment. In particular, architecture 1200 includes an ABAP system in the example of FIG. 12. In some embodiments including a computing system other than an ABAP platform, the computing environment may differ from that depicted in FIG. 12. In some embodiments, architecture 1200 includes a prompt library (not expressly shown in FIG. 12) including system prompt(s) 1210 and pre-processor(s) and post-processor(s) 1215. In some aspects, ABAP system 1205, system prompt(s) 1210, and pre-processor(s) and post-processor(s) 1215 may be similar to ABAP system 1105, system prompt(s) 1150, and pre-processor(s) and post-processor(s) 1155 depicted in FIG. 11, including having similar functionality. In contrast to FIG. 11, FIG. 12 provides additional descriptive details regarding the illustrated system prompt(s) 1210 and the pre- and post-processor(s) 1215.

In some embodiments, a prompt 1210 includes a name, description, and one or more labels. Based on these attributes, a prompt may be retrieved from the prompt library. Accordingly, if a certain type of task is to be executed, a prompt engineering engine herein, with the assistance of AI in some embodiments, may determine or select a system prompt corresponding to the task type by, for example, a combination of the system prompt’s name, description. and labels. As also depicted, the system prompt 1210 may include other, certain content such as, for example, a set of rules and additional text information, regarding the prompt. The system prompt may include one or more parameters. In some instances, a system prompt might point to a next system prompt that is to be executed after the current, subject system prompt. The “next prompt” attribute or feature of a system prompt may be used to point to another system prompt. For example, a complex task might be broken down into simpler tasks and processed successively. In one scenario, an outbound LLM API might be called with a first system prompt, the result for the first system prompt may be received and retained, then a call to a next system prompt is issued to the outbound LLM API, and so on. This may be an example of chaining prompt executions. The next prompt parameter might be used to, for example, implement system prompt execution loops where a system prompt points back to itself or other system prompts. To avoid running endless loops, a prompt execution loop can be exited by a post-processor that checks the result after each iteration and stops the execution if a certain condition is fulfilled.

In some embodiments, a system prompt herein might have a retry on error specification for use in the event an error is encountered in processing the system prompt, where the retry on error specification may specify how many times to retry execution of the system prompt and also include a rule to provide the error information to the LLM. The LLM might use the error information in an attempt to fix or correct the error.

In some embodiments, the system prompt 1210 might be defined or otherwise indicated as being searchable. In some embodiments, the system prompts 1210 may be stored in a database table (or other data structure), where the system prompts may be designated or otherwise defined as being searchable or non-searchable. As used herein, a searchable system prompt might be searched by a combination of its name, description, and label(s) in the relevant database table. For example, the system prompt selection process(es) used by a prompt engineering engine herein (See, e.g., discussion of process 300 and architecture 1100) might automatically select an appropriate system prompt from a prompt library, wherein system prompts defined as being searchable can be found in the process of selecting prompts from the prompt library. In some embodiments, a searchable prompt herein might be called from an outside (i.e., external) source. In the instance a system prompt is not defined as being searchable, then this type of system prompt might only be used by calling it directly (i.e., specified by name). In some embodiments, non-searchable prompts may be called directly through an inbound prompt engine API (e.g., FIG. 11, inbound prompt engine API 1125). The option of non-searchable system prompts provides a mechanism to address system prompts that are not searchable directly. In an instance a non-searchable system prompt is directly called, a system prompt determination process herein that refers to a prompt library may be bypassed.

A system prompt may also include a list of corresponding pre- and post-processors 1215 associated therewith. In some embodiments, pre-processors and post-processors 1215 may be registered or otherwise associated with a system prompt. In this manner, when a particular system prompt is executed, the pre- and post-processors defined as being associated therewith are also executed. In some aspects, the pre- and post-processors may be method calls to some other code that can be implemented by the ABAP application(s). As illustrated in FIG. 12, the pre- and post-processor(s) might be defined to have a name and some certain functionality that might be expressed in ABAP code (or other computing environment appropriate code). The ABAP code may be called from the ABAP system application. In some instances, this ABAP code can access application data on the ABAP system from an internal data source 1220. In some instances, the ABAP code might execute to call out to some external data source 1225 (e.g., a search engine, document store, etc.) to fetch additional information that may be used to fulfill the task that is to be executed.

In some embodiments, process 300 (e.g., a computer-implemented method or process) and architectures 1100 and 1200 provide a framework for implementing various applications, including, for example, applications and use-cases involving different prompts, multiple prompts, iterative prompts, one or more different pre- and post-processors; use-cases including one prompt invoking the execution of another prompt, the splitting of a complex prompt task into smaller or multiple tasks); etc. Some other use-cases that a prompt engineering engine herein might be applied to may include, for example, code generation to generate code documentation (e.g., a coding style guide, etc.); an automated code review tool which, based on some clean code guideline(s), might provide recommendations of how to improve the reviewed code (e.g., analyze code changes and provide recommendations about, for example, "better" naming options for variables and other aspects that are subject to code style review); selecting and executing a post-processor to review code returned in a LLM reply to determine whether there are violations of some of the rules of a "clean code" guide; and other use-cases.

Figure 13:
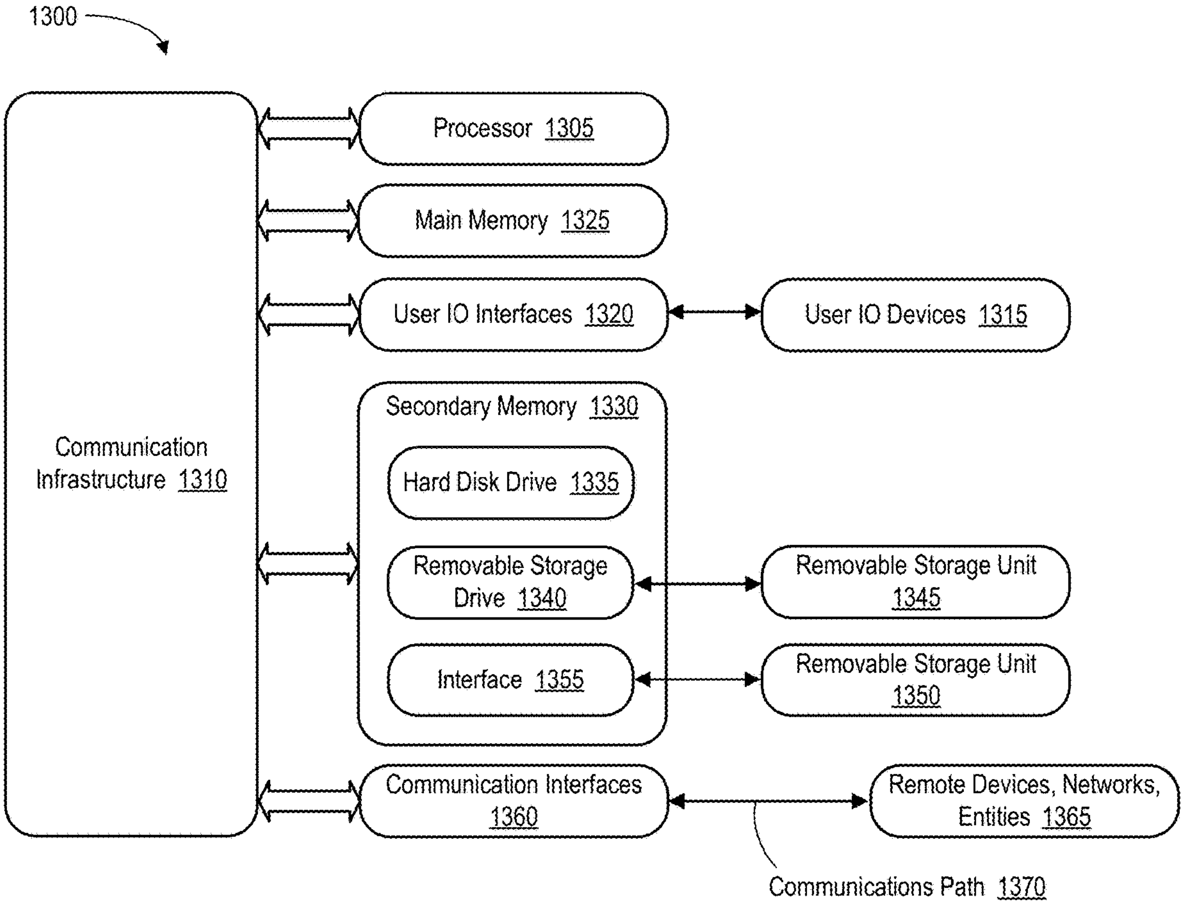
FIG. 13 is an illustrative block diagram of an apparatus or platform, in accordance with an example embodiment.

FIG. 13 is an illustrative block diagram of an apparatus or platform, in accordance with an example embodiment. Note that the embodiments described herein may be implemented using any number of different hardware configurations. For example, FIG. 13 is a block diagram of an apparatus or platform 1300 that may be, for example, associated with architectures 1100 and 1200 of FIGS. 11 and 12 (and any other system described herein). Platform 1300 comprises a processor 1305, such as one or more commercially available CPUs in the form of one-chip microprocessors, coupled to a communication device 1310 configured to communicate via a communication network (not shown in FIG. 13), and a main memory 1325. Communication device 1310 may be used to communicate, for example, with one or more remote user devices, networks, or entities 1365 via communication interfaces 1360 and communication path 1370. Platform 1300 further includes an input device 1315 (e.g., a computer mouse, a keyboard, etc.) and an output device 1320 (e.g., a computer monitor to render a display, transmit recommendations or alerts, create monitoring reports, etc.). According to some embodiments, a mobile device, PC, and other devices may be used to exchange data with platform 1300.

Processor 1305 also communicates with a storage device 1330. Storage device 1330 can be implemented as a single database or the different components of storage device 1330 can be distributed using multiple databases (that is, different deployment data storage options are possible). Storage device 1330 may comprise any appropriate data storage device, including combinations of magnetic storage devices (e.g., a hard disk drive 1335), optical storage devices, mobile telephones, and semiconductor memory devices. Storage device 1330 may store a program that may be shared with removable storage unit 1345 for controlling the processor 1305. Processor 1305 performs instructions of one or more programs stored on one or more of the storage devices 1340, 1345, and 1350 that may be executed to operate in accordance with any of the embodiments described herein (e.g., FIGS. 3-10).

Programs may be stored in a compressed, uncompiled, encrypted, and other configured format. Stored programs may furthermore include processor-executable code and other program elements, such as an operating system, clipboard application, a database management system, and device drivers used by processor 1305 to interface with peripheral devices. In some embodiments (such as the one shown in FIG. 13), storage device 1330 further stores the data on a removable storage unit 1350 via interface 1355.

As used herein, data may be "received" by or "transmitted" to, for example: (i) the platform 1300 from another device; or (ii) a software application or module within the platform 1300 from another software application, module, or any other source.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM) such as main memory 1325, and any other non-transitory transmitting or receiving medium such as the Internet, cloud storage, the Internet of Things (IoT), or other communication network or link. The article of manufacture containing the computer code may be made and used by executing the code directly from one medium, by copying the code from one medium to another medium, or by transmitting the code over a network.

The computer programs (also referred to as programs, software, software applications, "apps", or code) may include, for example, computer readable machine instructions for a programmable processor, and may be implemented in a high-level procedural, object-oriented programming language, assembly/machine language, etc. As used herein, the terms "machine readable medium" and "computer readable medium" refer to any computer program product, apparatus, cloud storage, Internet of Things, and device (e.g., magnetic discs, optical disks, memory, programmable logic devices (PLDs)) used to provide machine instructions and data to a programmable processor, including a machine readable medium that receives machine instructions as a machine-readable signal. The "machine readable medium" and "computer readable medium," however, do not include transitory signals. The term "machine readable signal" refers to any signal that may be used to provide machine instructions and any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:

a memory storing processor-executable program code; and a processor to execute the processor-executable program code in a computing environment, capable of:

receiving, via an inbound prompt engine application programming interface (API), a prompt specifying at least one task type, the at least one task type specifying a type of task to be accomplished by the prompt, the at least one task type including at least one of a task to explain a specified code artifact and a task to create a specified code artifact;

determining, via a first artificial intelligence (AI) system and a prompt selector, a system prompt to select from a prompt library based on the received prompt, the system prompt including AI system configuration details corresponding to the at least one task type and including a combination of a name, a description and at least one label of the system prompt;

generating, via a pre-processor provided by the prompt library to pre-process the system prompt, a pre-processed prompt, the pre-processor includes a reference finder that finds in the system prompt references to code existing in the computing environment and a code extractor that fetches the code from the computing environment, the pre-processed prompt including the fetched code;

transmitting, via an outbound large language model API, as an input prompt, the pre-processed prompt to a second AI system and receiving, in response to the second AI system executing the pre-processed prompt, a result from the second AI system;

storing, via a data repository, a record of the result from the second AI system;

post-processing, by a prompt engine orchestrator, the result received from the second AI system to generate a post-processed result, the post-processed result being generated based on a post-processor provided by the prompt library and associated with the determined system prompt and the at least one task type specified in the prompt; and storing a record of the post-processed result in the data repository.

2. The system of claim 1, wherein the prompt is received from at least one of a user, an executable application, an application development environment.

3. The system of claim 1, wherein the prompt library including at least one of a set of rules corresponding to the at least one task type, a set of system prompt templates wherein each system prompt template corresponds to each of the at least one task type, and a set of system prompt templates wherein one or more system prompt templates correspond to each of the at least one task type.

4. The system of claim 1, wherein the processor-executable program code is further capable of determining, via a prompt engine orchestrator, at least one pre-processor to use to accomplish the pre-processing of the system prompt, the at least one pre-processor being determined based on the at least one task type.

5. The system of claim 1, wherein the code referenced in the system prompt comprises ABAP (Advanced Business Application Programming) programming language.

6. A method implemented in a computing environment, the method comprising:

receiving a prompt, the prompt specifying at least one task type, the at least one task type specifying a type of task to be accomplished by the prompt, the at least one task type including at least one of a task to explain a specified code artifact and a task to create a specified code artifact;

determining a system prompt by a first artificial intelligence (AI) system and a processor-enabled prompt selector to select from a prompt library based on the received prompt, the system prompt including AI system configuration details corresponding to the at least one task type and including a combination of a name, a description and at least one label of the system prompt;

pre-processing the system prompt via a pre-processor provided by the prompt library to generate a pre-processed prompt, the pre-processor includes a reference finder that finds in the system prompt references to code existing in the computing environment and a code extractor that fetches the code from the computing environment, the pre-processed prompt including the fetched code;

transmitting, as an input prompt, the pre-processed prompt to a second AI system;

receiving, in response to the second AI system executing the pre-processed prompt, a result from the second AI system;

storing a record of the result from the second AI system in a data repository;

post-processing the result received from the second AI system to generate a post-processed result, the post-processed result being generated based on a post-processor provided by the prompt library and associated with the determined system prompt and the at least one task type specified in the prompt; and storing a record of the post-processed result in the data repository.

7. The method of claim 6, wherein the prompt is received from at least one of a user, an executable application, an application development environment.

8. The method of claim 6, wherein the prompt library including at least one of a set of rules corresponding to the at least one task type, a set of system prompt templates wherein each system prompt template corresponds to each of the at least one task type, and a set of system prompt templates wherein one or more system prompt templates correspond to each of the at least one task type.

9. The method of claim 6, further comprising determining at least one pre-processor to use to accomplish the pre-processing of the system prompt, the at least one pre-processor being determined based on the at least one task type.

10. The method of claim 6, wherein the code referenced in the system prompt comprises ABAP (Advanced Business Application Programming) programming language.

11. A non-transitory, computer readable medium storing instructions, which when executed by at least one processor in a computing environment cause a computer to perform a method comprising:

receiving a prompt, the prompt specifying at least one task type, the at least one task type specifying a type of task to be accomplished by the prompt, the at least one task type including at least one of a task to explain a specified code artifact and a task to create a specified code artifact;

determining a system prompt by a first artificial intelligence (AI) system and a processor-enabled prompt selector to select from a prompt library based on the received prompt, the system prompt including AI system configuration details corresponding to the at least one task type and including a combination of a name, a description and at least one label of the system prompt;

pre-processing the system prompt via a pre-processor provided by the prompt library to generate a pre-processed prompt, the pre-processor includes a reference finder that finds in the system prompt references to code existing in the computing environment and a code extractor that fetches the code from the computing environment, the pre-processed prompt including the fetched code;

transmitting, as an input prompt, the pre-processed prompt to a second AI system;

receiving, in response to the second AI system executing the pre-processed prompt, a result from the second AI system;

storing a record of the result from the second AI system in a data repository;

post-processing the result received from the second AI system to generate a post-processed result, the post-processed result being generated based on a post-processor provided by the prompt library and associated with the determined system prompt and the at least one task type specified in the prompt; and storing a record of the post-processed result in the data repository.

12. The medium of claim 11, wherein the prompt is received from at least one of a user, an executable application, an application development environment.

13. The medium of claim 11, wherein the prompt library including at least one of a set of rules corresponding to the at least one task type, a set of system prompt templates wherein each system prompt template corresponds to each of the at least one task type, and a set of system prompt templates wherein one or more system prompt templates correspond to each of the at least one task type.

14. The medium of claim 11, further comprising determining at least one pre-processor to use to accomplish the pre-processing of the system prompt, the at least one pre-processor being determined based on the at least one task type.

* * * * *